United States Patent
Górecki

(10) Patent No.: US 6,733,579 B1
(45) Date of Patent: May 11, 2004

(54) CHROME FREE FINAL RINSE FOR PHOSPHATED METAL SURFACES

(75) Inventor: George J. Górecki, Niles, IL (US)

(73) Assignee: Nalco Company, Naperville, IL (US)

( * ) Notice: Subject to any disclaimer, the term of this patent is extended or adjusted under 35 U.S.C. 154(b) by 17 days.

(21) Appl. No.: 10/268,385

(22) Filed: Oct. 10, 2002

(51) Int. Cl.$^7$ .......................... C09K 15/32; B32B 15/04
(52) U.S. Cl. .................... 106/287.11; 428/447
(58) Field of Search ................ 106/287.11; 428/447

(56) References Cited

U.S. PATENT DOCUMENTS

| 5,053,081 A | 10/1991 | Jacob |
| 5,531,820 A | 7/1996 | Górecki |
| RE35,688 E | 12/1997 | Górecki |
| 5,814,137 A * | 9/1998 | Blohowiak et al. ...... 106/14.13 |

OTHER PUBLICATIONS

CAPLUS 1987:158056, Matsuoka et al, "Silane–containing top coatings for metal deposited moldings", Nov. 1986.*

* cited by examiner

*Primary Examiner*—David Brunsman
(74) *Attorney, Agent, or Firm*—Michael B. Martin; Thomas M. Breininger

(57) ABSTRACT

An aqueous composition comprising 3-aminopropyltriethoxysilane; 3-glycidoxypropyltrimethylsilane; one or more alcohols; and one or more Group IVA metal ions selected from zirconium, hafnium and titanium, or a mixture thereof and having a pH of about 2 to about 9 and use of the composition to treat conversion coated metal surfaces prior to application of a siccative coating.

11 Claims, No Drawings

CHROME FREE FINAL RINSE FOR PHOSPHATED METAL SURFACES

TECHNICAL FIELD

This invention relates to the treatment of metal surfaces prior to the application of a siccative organic coating. Specifically, this invention relates to the treatment of conversion-coated metal with an aqueous solution comprised of 3-aminopropyltriethoxysilane, 3-glycidoxypropyltrimethylsilane and one or more Group IVA metal ions.

BACKGROUND OF THE INVENTION

The primary purposes of applying siccative coatings (also known as "organic coatings", "organic finishes", or simply, "paints") to metal substrates such as steel, aluminum, zinc and their alloys, are protection of the metal surface from corrosion and for aesthetic reasons. It is well known, however, that many organic coatings adhere poorly to metals in their normal state. As a result, corrosion-resistance characteristics of the siccative coating are substantially diminished. It is therefore a typical procedure in the metal finishing industry to subject metals to a pretreatment process whereby a conversion coating is formed on the metal surface.

This conversion coating acts as a protective layer, slowing the onset of the degradation of the base metal, owing to the conversion coating being less soluble in a corrosive environment than is the base metal. The conversion coating also serves as a recipient for the subsequent siccative coating. The conversion coating has a greater surface area than does the base metal and thus provides for a greater number of adhesion sites for the interaction between the conversion coating and the organic finish. Typical examples of such conversion coatings include, but are not limited to, iron phosphate coatings, zinc phosphate coatings, and chromate conversion coatings.

Normally, the application of an organic finish to a conversion-coated metal surface is not sufficient to provide the highest levels of paint adhesion and corrosion resistance. Painted metal surfaces are able to reach maximum performance levels when the conversion-coated metal surface is treated with a "final rinse", also referred to in the art as a "post-rinse" or a "seal rinse" prior to the painting operation. Final rinses are typically aqueous solutions containing organic or inorganic entities designed to improve paint adhesion and corrosion resistance. This may be accomplished by altering the electrochemical state of the conversion-coated substrate by rendering it more passive or it may be accomplished by forming a barrier film which prevents a corrosive medium from reaching the metal surface.

The most effective final rinses in general use today are aqueous solutions containing chromic acid, partially reduced to render a solution comprised of a combination of hexavalent and trivalent chromium. Final rinses of this type have long been known to provide the highest levels of paint adhesion and corrosion resistance. Chromium-containing final rinses, however, have serious drawbacks due to their inherent toxicity and hazardous nature. These concerns make chromium-containing final rinses less desirable from a practical standpoint, when one considers such issues as safe handling of chemicals and the environmental problems associated with the discharge of such solutions into municipal water streams. Thus, it has been a goal of the industry to find chromium-free alternatives which are less toxic and more environmentally benign than chromium-containing final rinses while also providing comparable effectiveness with regard to paint adhesion and corrosion resistance properties.

A final rinse composition containing 3-aminopropyltriethoxysilane and a titanium chelate is disclosed in U.S. Pat. No. 5,053,081.

A final rinse composition containing an organosilane selected from methyltrimethoxysilane and phenyltrimethoxysilane and mixtures thereof and Group IVA metal ions is disclosed in U.S. Pat. No. 5,531,820.

A final rinse composition containing an organosilane selected from 3-glycidoxypropyltrimethoxysilane, methyltrimethoxysilane, γ-methacryloxytrimethoxysilane and phenyltrimethoxysilane, and mixtures thereof and zirconium ion is disclosed in Re. 35,688.

SUMMARY OF THE INVENTION

I have discovered that aqueous solutions containing 3-aminopropyltriethoxysilane and 3-glycidoxypropyltrimethylsilane and Group IVA metal ions, namely, zirconium, titanium or hafnium, or mixtures thereof, provide paint adhesion and corrosion resistance characteristics comparable or superior to those attained with chromium-containing final rinses in accelerated corrosion tests.

Accordingly, in its principal aspect, this invention is an aqueous composition comprising i) about 0.06 to about 25 weight percent 3-aminopropyltriethoxysilane;

ii) about 0.06 to about 25 weight percent 3-glycidoxypropyltrimethylsilane;

iv) up to about 5 weight percent of one or more alcohols; and v) about 0.005 to about 25 weight percent of a Group IVA metal ion selected from zirconium, hafnium and titanium, or a mixture thereof, wherein said aqueous solution has a pH of about 2 to about 9.

The aqueous composition of this invention is a suitable replacement for final rinse products that contain chromates as it is safe and does not require expensive waste treatment procedures, thereby eliminating the hazards and expense associated with chromate-containing products.

DETAILED DESCRIPTION OF THE INVENTION

The aqueous solution of this invention is prepared by dissolving the 3-aminopropyltriethoxysilane and 3-glycidoxypropyltrimethylsilane in one or more water miscible alcohol solvents and then adding an aqueous solution containing zirconium, titanium or hafnium ions, or mixtures thereof, with mixing to the silanes such that the pH of the resulting solution is in the range of about 2.0 to about 9.0. Preferred water miscible alcohol solvents include methanol, ethanol, isopropanol, and the like. Ethanol is more preferred. The solution is then mixed for at least 30 minutes to complete the hydrolysis of the organosilanes.

The pH of the aqueous solution is then measured. If the pH is outside the desired range, water or Group IVA metal salt is added to bring the pH within the desired range. Hence, the amount of Group IVA metal ion present in the finished solution is a function of the pH. The aqueous solution of this invention typically contains Group IVA metal ions at a concentration of at least about 0.005 weight percent.

The source of the zirconium, hafnium or titanium ions can be hexafluorozirconic acid, zirconium basic sulfate, zirconium hydroxychloride, zirconium basic carbonate, zirconium oxychloride, zirconium acetate, zirconium fluoride, zirconium hydroxide, zirconium orthosulfate, zirconium oxide, zirconium potassium carbonate, hexafluorotitanic acid, hafnium oxychloride, and the like, and mixtures thereof. When zirconium-containing salts such as zirconium basic sulfate, zirconium hydroxychloride, zirconium basic carbonate, zirconium oxychloride are used as the zirconium source, the salts must be dissolved in 50% hydrofluoric acid in order to effect dissolution.

The aqueous composition may be prepared on-site for immediate use as described herein, or prepared as a concentrate for shipping to the site for dilution to the desired concentration with water.

In a preferred aspect, the aqueous solution is prepared as a concentrate comprising about 12.5 to about 25 weight percent 3-aminopropyltriethoxysilane, about 12.5 to about 25 weight percent 3-glycidoxypropyl and about 11.8 to about 25 weight percent of the Group IVA metal ion.

In a preferred aspect of this invention, the aqueous composition of has a pH is about 4 to about 5.

In another preferred aspect, the Group IVA metal ion is zirconium.

The formation of conversion coatings on metal substrates is well known within the metal finishing industry. Metal substrates suitable for treating are primarily steel, but any metal surface that can accept a conversion coating is acceptable. These include, but are not limited to, iron, steel, aluminum, aluminum alloys, zinc, zinc alloys and other non-ferrous metals that can be conversion coated. Cold-rolled steel, hot-rolled steel, aluminum and zinc-coated (galvanized) metals are especially suitable.

In general, the conversion coating process is usually described as a process requiring several pretreatment stages. The actual number of stages is typically dependent on the final use of the painted metal article. The number of pretreatment steps normally varies anywhere from two to nine stages.

A representative example of a pretreatment process involves a five-stage operation where the metal to be ultimately painted goes through a cleaning stage, a water rinse, a conversion coating stage, a water rinse and a final rinse stage. The final rinse (also referred to as a seal rinse) provides an additional level of paint adhesion and corrosion resistance to the conversion-coated metal surface. The intervening water rinses are needed to wash away any excess chemical from the preceding step to prevent drag-in into subsequent steps.

Modifications to the pretreatment process can be made according to specific needs. For example, surfactants can be incorporated into some conversion coating baths so that cleaning and the formation of the conversion coating can be achieved simultaneously. In other cases it may be necessary to increase the number of pretreatment stages so as to accommodate more pretreatment steps.

Examples of the types of conversion coatings that can be formed on metal substrates are iron phosphates and zinc phosphates. Iron phosphating is usually accomplished in no more than five pretreatment stages, while zinc phosphating usually requires a minimum of six pretreatment stages. The number of rinse stages between the actual pretreatment steps can be adjusted to insure that rinsing is complete and effective so that the chemical pretreatment from one stage is not carried on the metal surface to subsequent stages, thereby possibly contaminating them. It is typical to increase the number of rinse stages when the metal parts to be treated have unusual geometries or areas that are difficult for the rinse water to contact.

Accordingly, in another aspect, this invention is a method of treating a conversion coated metal surface comprising applying to the metal surface an aqueous composition comprising i) about 0.06 to about 7 weight percent 3-aminopropyltriethoxysilane; ii) about 0.06 to about 7 weight percent 3-glycidoxypropyltrimethylsilane; iii) up to about 5 weight percent alcohol; and iv) about 0.005 to about 0.25 weight percent of a Group IVA metal ion selected from zirconium, hafnium and titanium, or a mixture thereof, wherein said aqueous solution has a pH of about 2 to about 9.

In another preferred aspect, an aqueous composition comprising i) about 0.25 to about 2 weight percent 3-aminopropyltriethoxysilane; ii) about 0.25 to about 2 weight percent 3-glycidoxypropyltrimethylsilane and iii) about 0.005 to about 0.25 weight percent of zirconium ion, wherein said aqueous solution has a pH of about 4 to about 5 is applied to the metal surface.

The aqueous composition can be applied to the conversion coated metal by any number of conventional means including immersion, spraying, brushing, rolling, and the like. Preferably, the aqueous composition is applied using either an immersion or a spray operation.

In immersion operations, the metal articles are submersed in the various pretreatment baths for defined intervals before moving on to the next pretreatment stage. A spray operation is one where the pretreatment solutions and rinses are circulated by means of a pump through risers fashioned with spray nozzles. The metal articles to be treated normally proceed through the pretreatment operation by means of a continuous conveyor. Virtually all pretreatment processes can be modified to run in spray mode or immersion mode, and the choice is usually made based on the final requirements of the painted metal article. It is to be understood that the invention described herein can be applied to any conversion-coated metal surface.

The aqueous composition of this invention is applied at temperatures about 40° F. to about 180° F., preferably about 60° F. to about 90° F.

The treated conversion-coated metal article is then dried by various means including air drying, forced air drying and oven drying.

The metal article is now ready for application of the siccative coating. The treated surface is, however, capable of withstanding relatively mild or short term corrosive conditions without further finishing or coating.

Accordingly, in another aspect, this invention is a treated conversion coated metal surface prepared by applying to a conversion coated metal surface an aqueous composition comprising i) about 0.06 to about 7 weight percent 3-aminopropyltriethoxysilane;

ii) about 0.06 to about 7 weight percent 3-glycidoxypropyltrimethylsilane;

iii) up to about 5 weight percent of one or more alcohols; and iv) about 0.005 to about 0.25 weight percent of a Group IVA metal ion selected from zirconium, hafnium and titanium, or a mixture thereof, wherein said aqueous solution has a pH of about 2 to about 9.

The foregoing may be better understood by reference to the following Examples, which are presented for purposes of illustration and are not intended to limit the scope of this invention.

EXAMPLE 1

Preparation of a Representative Rinse Solution Concentrate

3-Aminopropyltriethoxysilane (12.5 kg) and 3-glycidoxypropyltrimethylsilane (12.25 kg) and ethanol (2.0 kg) are placed in a mixing vessel and the solution is mixed for at least 30 minutes. In a separate vessel, deionized water (61.2 kg) and hexafluorozirconic acid (11.8 kg, 50% active) are mixed. The acid solution is then added slowly to the solution of silanes in alcohol and the resulting solution is mixed for at least 30 mintues.

EXAMPLE 2

Comparison of a Representative Composition with a Representative Chromate-containing Rinse Table 1 compares GLOBRITE 763, a chrome-containing final rinse composition available from Ondeo Nalco Company, Naperville, Ill. and a representative 3-aminopropyltriethoxysilane/3glycidoxypropyltrimethylsilane/zirconium ion final rinse composition prepared by diluting the concentrate of Example 1. Tests 1–5 represent results at five customer sites.

Table 1 shows results from salt spray testing (ASTM B-117). The test involves taking painted panels and introducing a defect into the coating that extends down to bare metal. The panels are then exposed to a salt fog (5% NaCl) and 100% relative humidity. The panels remain in the test for a predetermined exposure interval. Upon removal, loose paint and corrosion products are scraped away from the defect line. The total width of the corrosion creepage is measured. Smaller creepage values are indicative of superior corrosion resistance. The results clearly show that the final rinse composition of this invention compares very favorably with the chromate-containing product.

TABLE 1

Comparison of a Representative Silane Rinse Composition and a Chromate Rinse Composition

| Test # | Exposure (hr) | Creepage (Cr) | Creepage (silane) |
|---|---|---|---|
| 1 | 1176 | 3.8 | 3.7 |
| 2 | 600 | 1.9 | 3.8 |
| 3 | 1008 | 2.5 | 2.7 |
| 4 | 168 | 5.9 | 4.1 |
| 5 | 72 | 10.7 | 3.8 |

EXAMPLE 3

Comparison of a Representative Composition with a Representative Chromate-containing Rinse and a 3-aminopropyltriethoxysilane Rinse This Example compares the effectiveness of representative 3-aminopropyltriethoxysilane/3-glycidoxypropyltrimethylsilane/zirconium ion final rinse compositions of this invention with a representative chromate-containing rinse (GLOBRITE 763) and a representative 3-aminopropyltriethoxysilane/zirconium ion rinse at an industrial painting facility.

In Table 2, "APS" denotes 3-aminopropyltriethoxysilane, "GPS" denotes 3-glycidoxypropyltrimethylsilane and "Cr" denotes the chromate-containing rinse. Creepage is measured at 168 hours.

As shown by the data presented in Table 2, the rinse composition of this invention is comparable to the chromate-containing rinse composition and also superior to a representative rinse composition containing a comparable amount of APS alone.

TABLE 2

Comparison of Chromate, APS/GPS/Zr and APS/Zr Rinse Compostions
Creepage

| Cr | APS (0.5%) | APS (0.5%) + GPS (0.5%) | APS (0.15%) + GPS (0.35%) | APS (0.25%) + GPS (0.25%) | APS (0.35%) + GPS (0.15%) |
|---|---|---|---|---|---|
| 2.4 | 5.6 | 2.1 | 1.7 | 3.0 | 2.2 |

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

What is claimed is:

1. An aqueous composition comprising
   i) about 0.06 to about 25 weight percent 3-aminopropyltriethoxysilane;
   ii) about 0.06 to about 25 weight percent 3-glycidoxypropyltrimethylsilane;
   iv) up to about 5 weight percent of one or more alcohols; and
   v) about 0.005 to about 25 weight percent of a Group IVA metal ion selected from zirconium, hafnium and titanium, or a mixture thereof, wherein said aqueous solution has a pH of about 2 to about 9.

2. The aqueous composition of claim 1 comprising about 12.5 to about 25 weight percent 3-aminopropyltriethoxysilane, about 12.5 to about 25 weight percent 3-glycidoxypropyltrimethylsilane and about 11.8 to about 25 weight percent of the Group IVA metal ion.

3. The aqueous composition of claim 1 wherein the pH is about 4 to about 5.

4. The aqueous composition of claim 1 wherein the Group IVA metal ion is zirconium.

5. An aqueous composition comprising about 0.06 to about 7 weight percent 3-aminopropyltriethoxysilane, about 0.06 to about 7 weight percent 3-glycidoxypropyltrimethylsilane and about 0.005 to about 0.25 weight percent of a Group IVA metal ion.

6. A method of treating a conversion coated metal surface comprising applying the aqueous composition of claim 5 to the surface.

7. A method of treating a conversion coated metal surface comprising applying the aqueous composition of claim 6 to the surface.

8. The method of claim 6 wherein said applying comprises spraying the aqueous composition onto the metal surface.

9. The method of claim 6 wherein said applying comprises immersing the metal surface in the aqueous solution.

10. The method of claim 6 wherein the conversion coated metal surface is selected from cold-rolled steel, hot-rolled steel, aluminum and zinc-coated metals.

11. A conversion coated metal surface treated according to the method of claim 6.

* * * * *